(12) United States Patent
Burhanuddin et al.

(10) Patent No.: US 10,846,617 B2
(45) Date of Patent: Nov. 24, 2020

(54) CONTEXT-AWARE RECOMMENDATION SYSTEM FOR ANALYSTS

(71) Applicant: ADOBE INC., San Jose, CA (US)

(72) Inventors: Iftikhar Ahamath Burhanuddin, Bangalore (IN); Shriram Venkatesh Shet Revankar, Seattle, WA (US); Kushal Satya, New Delhi (IN); Biswarup Bhattacharya, West Bengal (IN); Abhilasha Sancheti, Assam (IN)

(73) Assignee: Adobe Inc., San Jose, CA (US)

( * ) Notice: Subject to any disclaimer, the term of this patent is extended or adjusted under 35 U.S.C. 154(b) by 867 days.

(21) Appl. No.: 15/594,394

(22) Filed: May 12, 2017

(65) Prior Publication Data
US 2018/0330248 A1    Nov. 15, 2018

(51) Int. Cl.
*G06N 20/00* (2019.01)
*G06F 3/0482* (2013.01)
*G06N 20/10* (2019.01)
*G06N 7/00* (2006.01)
*G06Q 10/06* (2012.01)

(52) U.S. Cl.
CPC .......... *G06N 20/00* (2019.01); *G06F 3/0482* (2013.01); *G06N 7/005* (2013.01); *G06N 20/10* (2019.01); *G06Q 10/063* (2013.01)

(58) Field of Classification Search
CPC combination set(s) only.
See application file for complete search history.

(56) References Cited

U.S. PATENT DOCUMENTS 10,565,750 B2 * 2/2020 Puri .................... G06Q 10/063

OTHER PUBLICATIONS

Brueggemann, Charles E.; Mitigating Information Overload: The Impact of "Context-Based Approach" To the Design of Tools for Intelligence Analysts; 2008 Naval Postgraduate School; 130 pages. (Year: 2008).*

* cited by examiner

*Primary Examiner* — Stanley K. Hill
(74) *Attorney, Agent, or Firm* — Shook, Hardy & Bacon L.L.P.

(57) ABSTRACT

Methods and systems are provided for providing recommendations from a recommendation system for an analytics system. A recommendation system can be trained using user intent and context. Such user intent can be determined using a user history of interaction with an analytics system. The user history can either be that of the user accessing the recommendation system or an exemplary user history to broaden the recommendations made by the recommendation system. Such context can be determined using context features within the analytics system. The trained recommendation system generated using user intent and context can provide analytics recommendations based on a current context of a user that predict the intent of the user.

20 Claims, 9 Drawing Sheets

FIG. 5A

CONTEXT-AWARE RECOMMENDATION SYSTEM FOR ANALYSTS

BACKGROUND

Business intelligence or analytics products can be used to collect data to generate reports. A user of such an analytics product (e.g., an analyst) can gain insight about customers, products, and/or business trends based on these reports. Certain business intelligence tasks require a user to analyze multiple reports. Oftentimes, a user looks through such reports in a natural progression where data in one report prompts them to analyze further data in one or more additional reports. In many cases, the complexity of an analytics product can prevent a user from fully utilizing the vast amount of gathered information that is available for analysis. Failing to analyze additional reports or data may occur, for example, when a user does not know that particular information is available in another report, or when a user does not know that certain information could be helpful with their analysis.

Several methods have been developed to help users better interact with computer-based products or systems. Some current methods focus on implementing virtual assistants, such as, for example, the virtual assistants incorporated with the operating system of mobile phones. Such virtual assistants are primarily based on processing text or speech queries from users by matching queries to suitable knowledge and/or web search results. However, these virtual assistants are limited in application because the provided results are driven by user text or voice queries. Another current method used to help users better interact with computer-based products or systems are virtual chatbots. However, similar challenges arise as those faced by virtual assistances, as these virtual chatbots use natural language processing to understand and process user queries.

As described, each of these existing technologies primarily rely on user queries to provide responses. Thus, such technologies are ineffective in proactively making recommendations without a user-provided query.

SUMMARY

Embodiments of the present invention are directed towards a recommendation system trained to recommend analytics data a user should view or use in their analysis. In accordance with embodiments of the present invention, such a recommendation system can be trained to make recommendations based on predicted user intent and current context of the user. Advantageously, such a recommendation system is capable of making users more proficient with an analytics product and/or helping new users become familiar with the product more quickly. In this way, a recommendation system can provide relevant recommendations using current context, where current context can include a report currently accessed by a user, variables attaches to the report, and/or associated aggregate data. Such a recommendation system also relies on predicted user intent, where predicted user intent is determined based on user history of interaction with the analytics product or system.

Creating such a recommendation system can be accomplished using machine learning. Machine learning can include using supervised learning algorithms to analyze training data and produce inferred functions, which can then be used by the recommendation system for mapping new examples, such as recommendations. With machine learning, the recommendation system can be personalized to a particular user based on what that user has done in the past, such as past interactions with an analytics system. To make the user explore other types of reports, during training of the recommendation system, user history of interactions with an analytics system can be supplemented using interactions from other users to make recommendations to the current user based on what other users have done in similar situations. One way in which this can be done is based upon user experience level. Where, for example, intermediate users of a systems are given suggestions based on the user history of expert users. In this way, a learning curve can be built into such a recommendation system allowing the complexity of a user's interaction with an analytics system grow over time. Upon completion of training, the recommendation system can be used to predict user intent based on current context to recommend, for example, recommend a list of reports the user should view as part of their analysis and/or tools the user should utilize during their analysis.

BRIEF DESCRIPTION OF THE DRAWINGS

FIG. 5A depicts an illustrative GUI of a recommendation system within an analytics system, in accordance with various embodiments of the present disclosure.

DETAILED DESCRIPTION

Figure 1:
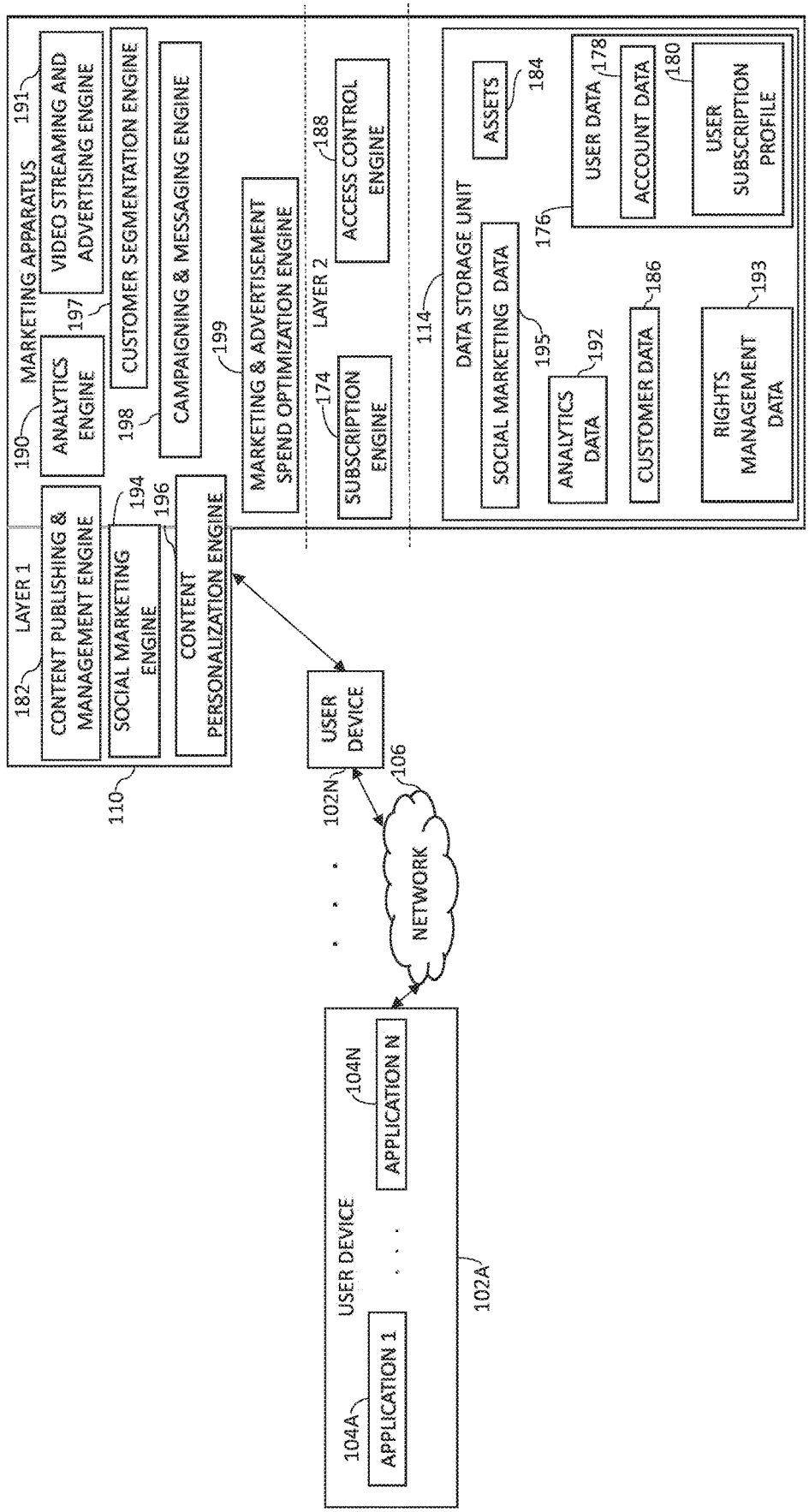
FIG. 1 depicts a diagram of an environment in which one or more embodiments of the present disclosure can be practiced, in accordance with various embodiments of the present disclosure.

Embodiments of the present invention are directed towards a recommendation system trained to recommend or suggest analytics information for a user to analyze. To make such recommendations, the recommendation system can utilize current context (e.g., a report being viewed by a user) and predicted or inferred user intent based on user history of interactions with an analytics program or system. Various terms and phrases are used herein to describe embodiments of the present invention. Some of the terms and phrases used herein are described here, but more details are included throughout the description.

A report refers to a presentation of data. A report can be an analytics report that presents analytics data. Reports can be displayed using, for example, a time series or a histogram.

Context generally refers to any type of information or data within or associated with analytics data (e.g., a report). For example, context can include content within a report, such as observed data (e.g., a spike in a time series or a histogram depicting something that influences the user to take a certain action upon viewing the report. As another example, context can include other features or attributes associated with analytics data, such as a report creator, a report name, a time of creation, an entity(s) that previously accessed the report, a subject of the report, an indication of type of data within the report, or the like.

Intent generally refers to an inferred or predicted intent of a user, such as an inferred unanswered question to which a user desires an answer. Accordingly, in embodiments, intent may be a likelihood that a user desires to view a particular report(s) in a certain progression to answer the user's unanswered question. As described herein, intent is generally inferred without use of a query input by a user.

Recommendations include analytics data suggested to a user for review or analytics tools suggested for the user to apply to analytics data. Recommendations can be based on inferred intent of a user along with the context of analytics data being currently presented to the user.

A navigation graph refers to a depiction of user history information based on how a user maneuvers though an analytics program viewing reports in a certain progression. A node of the navigation graph can signify a report viewed by a user and a directed edge between nodes signifies that the user transitioned from one report, or node, to another report, or node.

In analytics programs, a vast amount of data can be gathered and presented in numerous manners. The vast amount of data and the reporting complexity can make it difficult to efficiently and effectively analyze data. For example, a user (e.g., an analyst) may review multiple reports to arrive at a conclusion or answer for a particular task. Reviewing multiple reports can be time-consuming and tedious. Further, a user may fail to review particular data that may be valuable for a particular analysis. For instance, a user may inadvertently forego review of a report or may be unaware of a report having pertinent data.

With the advancement of technology, virtual assistants and virtual chatbots have been increasingly used to provide recommendations to users. Such recommendations, however, are generally limited in application and based on user queries provided via text or voice. Other existing recommendation systems, such as systems that recommend videos, rely on prior user activity. These recommendations, however, are application specific and fail to account for user intent and activity sequence. As such, existing technologies are generally deficient in proactively providing recommendations in an analytics environment.

Accordingly, embodiments of the present invention are directed to automatically providing recommendations in an analytics environment. In particular, and as described herein, recommended analytics data can be suggested to a user for review without the user having to provide a query. In this regard, user intent can be inferred and utilized along with the current context to provide an analytics-related recommendation. One analytics-related recommendation discussed herein includes a recommendation of a data report to view subsequent to a data report begin currently viewed. Such an analytics-related recommendation may facilitate a more comprehensive analysis of the data.

Providing recommendations in an analytics environment can provide better insight into features or data offered by an analytics system that will improve a user's usage and understanding of the analytics data. Further, to reduce the amount of time and effort a user spends learning an analytics system, analytics-related recommendations can be used to make users more proficient and/or help new users become more familiar with the analytics system more quickly.

As described herein, recommendations provided herein are generally based on inferred intent of the user along with the context of analytics data being currently presented to a user. At a high-level, to generate recommendations, a user intent model can be created, indicating a user history of interactions with an analytics system. Such a user intent model can be used to build a navigation graph based on the user history of reports that a user has viewed within the analytics system (e.g., a node of the navigation graph can signify a report viewed by a user and a directed edge between nodes signifies that the user transitioned from one report, or node, to another report, or node). This navigation graph can depict user history information based on how the user maneuvered though the analytics program where intent of a user can be characterized as the likelihood that a user would want to view particular reports in a certain progression. In this way, user history can be used to determine intent, or how a user progresses from one report to another when using the analytics system. The user intent model can be used alongside a context model based on context features within the analytics system. Context can refer to content a user sees within a report, such as observed data (e.g., a spike in a time series or a histogram depicting something that influences the user to take certain action after seeing the report). Features of a report can be extracted and compiled into the context model allowing the recommendation system to recognize the current context of a user when making a recommendation. In this way, the context model can be used to determine the context of analytics data being currently presented to a user. Such a user intent model and context model can be combined to make recommendations to a user based on current context and predicted intent of the user.

Turning to FIG. 1, FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device can include various products, applications or services supported by the marketing apparatus 110 via the network 106. It is to be appreciated that following description may generally refer to the user device 102A as an example and any other user device can be used.

A user of the user device can utilize various products, applications, or services supported by the marketing apparatus 110 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the marketing apparatus 110.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 102A-102N can be connected to the marketing apparatus 110 via a network 106. Examples of the network 106 include, but are not limited to, internet, local area network (LAN), wireless area network, wired area network, wide area network, and the like.

The marketing apparatus 110 includes one or more engines for providing one or more digital experiences to the user. The marketing apparatus 110 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 110 also includes a data storage unit 114. The data storage unit 114 can be implemented as one or more databases or one or more data servers. The data storage unit 114 includes data that is used by the engines of the marketing apparatus 110.

In one embodiment, the marketing apparatus 110 can be divided into two layers of engines, i.e. Layer 1 including core engines that provide workflows to the user and Layer 2 including shared engines that are shared among the core engines. Any core engine can call any of the shared engine for execution of corresponding task. In another embodiment, the marketing apparatus does not have layers and each core engine can have an instance of the shared engines. In either embodiment, each core engine can access the data storage unit 114 directly or through the shared engines.

The user of the user device 102A visits a webpage or an application store to explore applications supported by the marketing apparatus 110. The marketing apparatus 110 provides the applications as a software as a service (SaaS), or as a standalone application that can be installed on the user device 102A, or as a combination. The user creates an account with the marketing apparatus 110 by providing user details and also by creating login details. Alternatively, the marketing apparatus 110 can automatically create login details for the user in response to receipt of the user details.

The user can also contact the entity offering the services of the marketing apparatus 110 and can get the account created through the entity. The user details are received by a subscription engine 174 and stored as user data 176 in the data storage unit 114. In some embodiments, the user data 114 further includes account data 178 under which the user details are stored.

The user can opt for subscription of one or more engines of the marketing apparatus 110. Based on subscription details of the user, a user subscription profile 180 is generated by the subscription engine 174 and stored. The user subscription profile 180 is stored in the data storage unit 114 and indicates entitlement of the user to various products or services. The user subscription profile 180 also indicates type of subscription, i.e. premium subscription or regular subscription.

The marketing apparatus 110 includes a content publishing and management engine 182 that enables the user to create websites and other content. The content publishing and management engine 182 provides an end to end workflow to the user right from creation of content, to hosting of content, to publishing of content, and finally, to management, i.e. editing and republishing, of content. The content publishing and management 182 further includes one or more engines (not shown in FIG. 1), such as asset management engine, website management engine, mobile content management engine, form management engine, search engine and community management engine to enable one or more workflows. The user can create content, such as forms, mobile application or webpage content, using the content publishing and management 182. The user can either do the creation or can send it for creation to third party via workflows provided through the content publishing and management engine 182. The user then publishes the content and manages it through the content publishing and management engine 182. The user can also create communities or forums for discussions with customers and manage the communities through the content publishing and management engine 182. The content publishing and management engine 182 also provides asset management capabilities including asset searching using various tags and metadata. The content publishing and management engine 182 stores assets 184 in the data storage unit 114. Examples of the assets 182 include, but are not limited to, image, text, document, video, audio, font, and metadata. In addition, the content publishing and management engine 182 enables multisite, i.e. multiple websites and mobile content, management workflows, and commerce, i.e. personalized shopping experiences that incorporate video, social, and other dynamic media, related workflows.

Each engine of the marketing apparatus 110 also stores customer data 186 for the user in the data storage unit 114. The user or the entity of the user can have one or more customers, including potential customers, and hence, the one or more engines of the marketing apparatus 110 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the marketing apparatus 110 or each engine can have one instance of the access control engine 188. The access control engine 188 determines if the user has access to a particular customer data 186 based on the subscription of the user and access rights of the user.

The marketing apparatus 110 also includes an analytics engine 190. The user can enable tracking of the content while creating the content or at any other point. Various methods of tracking can be used. For example, tracking code can be embedded into the content for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user. In addition, in one embodiment, the analytics engine 190 also acts as a shared engine and is accessible by other engines to obtain meaningful analysis on basis of which other engines can offer various functionalities to the user. In another embodiment, each engine can have an instance of the analytics engine 190 which is customized according to need of that engine. The analytics engine 190 is used for tracking all types of content, such as mobile application, video, image, website, document, advertisement, and also for tracking the assets 184. The analytics engine 190 also supports predictive intelligence to provide predictions based on the analytics data 192. The analytics engine 190 also stitches information tracked from various sources where the content is consumed and provides a holistic view, i.e. 360 degrees' view of the analytics data 192.

The marketing apparatus 110 also includes a social marketing engine 194 for providing social marketing related workflows. The social marketing engine 194 allows the user to share the content on social networks, and then manage the content sharing and associated information, such as posts and comments. For example, the social marketing engine 194 provides recommendations to the user to determine when to post which content and to determine how audience will react to the post, helps the user to respond to queries from viewers of post, and performs other managing related to the post. In addition to the social networks, the social marketing engine 194 also provides workflows to manage content on blog, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 110. Alternatively, the engines can have an instance of the social marketing engine 194 and can directly access the social marketing data 195.

The marketing apparatus 110 also includes a content personalization engine 196. The content personalization engine 196 enables the user to provide different digital experiences to the customers when different customers visit same webpage or same application of the user. The content personalization engine 196 provides various workflows to the user to create different versions of the webpage or the application or the content and to perform A/B testing. Based on the testing, the user may choose to provide different personalization for different sets of customers. The content personalization engine 196 also uses the customer data 186 which can be part of the analytics data 192, in one embodiment, or can be stored separately in another embodiment. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented. The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

The marketing apparatus 110 also includes a campaigning and messaging engine 198 that enables workflows for the user to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments. A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user. The user can specify attributes for customer segmentation and the campaigning and messaging engine 198 automatically picks the customers to whom the message is to be sent and also personalizes the message based on the attributes of the customer segment. The campaigning and messaging engine 198 also provides A/B testing option to the user to test which message to send out of two messages. The campaigning and messaging engine 198 also stores different customer segments for each user in the customer data 186. In addition, the content used for creating personalized messages, email identifiers and other data is stored as part of the customer data 186 which can be specific for the user and inaccessible to other users.

The marketing apparatus 110 also includes marketing and advertisement spend optimization engine 199. The marketing and advertisement spend optimization engine 199 helps the user in budget management for running marketing campaigns, showing advertisements on websites, as search results, social advertisements, and other form of advertising. The marketing and advertisement spend optimization engine 199 tracks budget spend of the user and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing content performed. The customer data 186 further indicates what type of customers visited the marketing content and the analytics data 192 further indicates who all among those customers ended up in performing a transaction.

In various embodiments, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user.

The marketing apparatus 110 also includes a video streaming and advertising engine 191 that helps the user, such as broadcasters, cable networks and service providers create and monetize engaging and personalized viewing experiences. The video streaming and advertising engine 191 can be implemented to provide a software development kit to the user to build and deliver videos to the customers. In addition, the video streaming and advertising engine 191 provides workflows to the user to insert advertisement within the videos and provides recommendations to the user for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user. For example, if a video is paid then the video streaming and advertising engine 191 does not provide access to the customer based on the rights management data 193. Using the rights management data 193, the video streaming and advertising engine 191 protects content rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

In accordance with embodiments of the present invention, application(s) 104 on user device can communicate with marketing apparatus 110. In embodiments, application(s) 104 can include an application, such as application 210 of FIG. 2, that facilitates a recommendation system making a recommendation, based on user intent and current context, in an analytics environment. Such an application can be provided to the user device 102A so that the analytics system and/or recommendation system operates via the user device. In this regard, application(s) 104 may be an analytics or business intelligence processing application.

Figure 2:
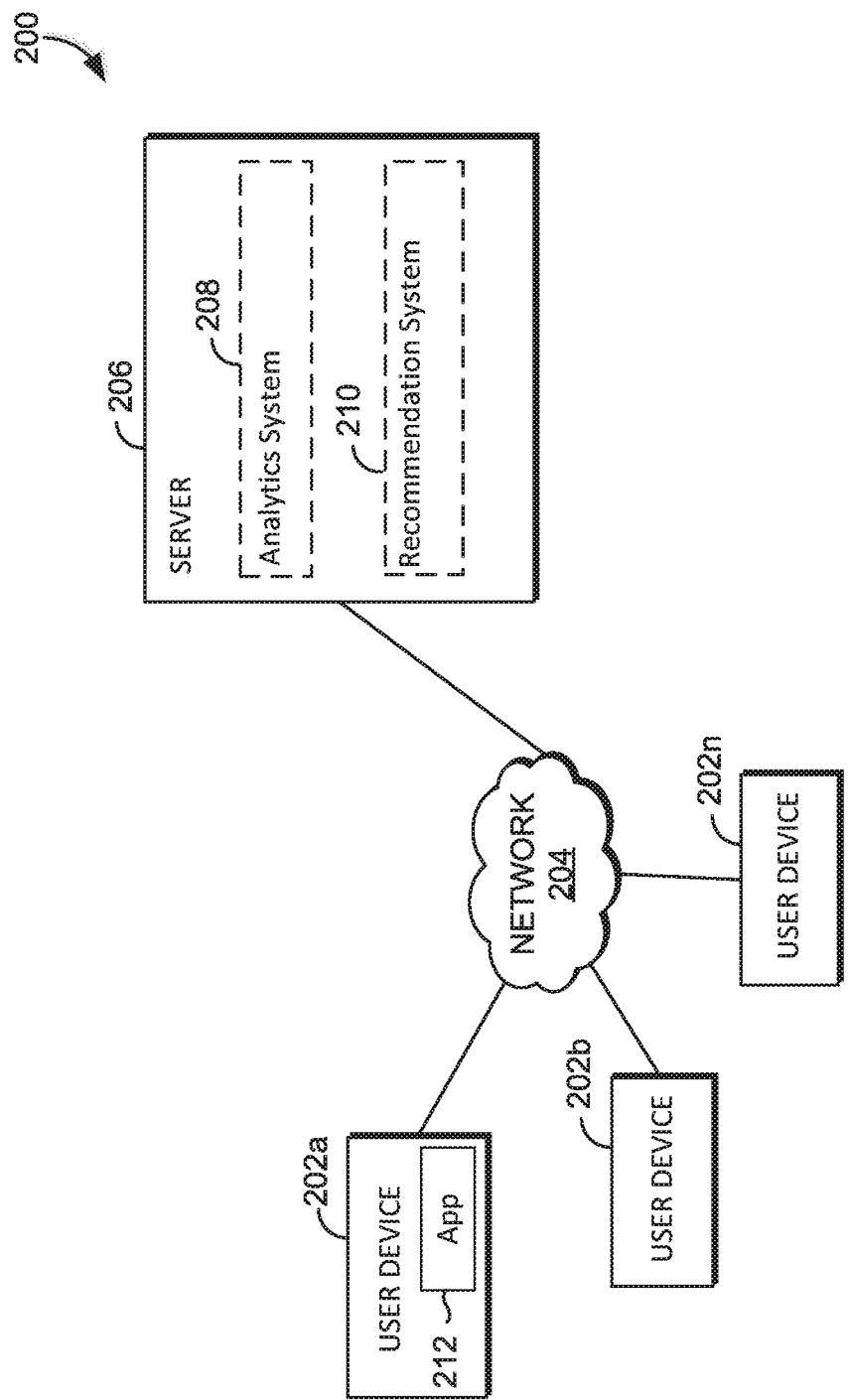
FIG. 2 depicts an example configuration of an operating environment in which some implementations of the present disclosure can be employed, in accordance with various embodiments of the present disclosure.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 200 shown in FIG. 2 is an example of one suitable operating environment. Among other components not shown, operating environment 200 includes a number of user devices, such as user devices 202a and 202b through 202n, network 204, and server(s) 206. Each of the components shown in FIG. 2 may be implemented via any type of computing device, such as one or more of computing device 800 described in connection to FIG. 8, for example. These components may communicate with each other via network 204, which may be wired, wireless, or both. Network 204 can include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within operating environment 200 within the scope of the present disclosure. Each may comprise a single device or multiple devices cooperating in a distributed environment.

User devices 202a through 202n can be any type of computing device capable of being operated by a user. For example, in some implementations, user devices 202a through 202n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 212 shown in FIG. 2. Application 212 is referred to as a single application for simplicity, but its functionality can be embodied by one or more applications in practice. As indicated above, the other user devices can include one or more applications similar to application 212.

The application(s) may generally be any application capable of facilitating the exchange of information between the user devices and the server(s) 206 in carrying out providing recommendations to a user based on current context and user intent predicted utilizing user history of interaction with the application. In some implementations, the application(s) comprises a web application, which can run in a web browser, and could be hosted at least partially on the server-side of environment 200. In addition, or instead, the application(s) can comprise a dedicated application, such as an application having analytics functionality. In some cases, the application is integrated into the operating system (e.g., as a service and/or program). It is therefore contemplated herein that "application" be interpreted broadly. In embodiments, the application may be integrated with analytics system 208 and/or recommendation system 210.

In accordance with embodiments herein, the application 212 can facilitate providing a recommendation to a user based on current context and predicted user intent utilizing user history of interaction with the application. In particular, a user can select or access a data, such as, for example, a data report, and based on the current context of the selected data, a recommendation can be provided using predicted intent of the user. For example, application 212 can be used to provide a recommendation to a user of the user device 202a.

As described herein, server 206 can facilitate providing a recommendation to a user via recommendation system 210. Server 206 includes one or more processors, and one or more computer-readable media. The computer-readable media includes computer-readable instructions executable by the one or more processors. The instructions may optionally implement one or more components of analytics system 208 and/or recommendation system 210, described in additional detail below. It should be appreciated that while analytics system 208 and recommendation system 210 are depicted as different systems, in embodiments, they can function as a single system capable of performing all the attributes of the systems as described.

Analytics system 208 can provide reports and/or analytics for a specialized business intelligence or analytics product. One exemplary analytics product is Adobe Analytics®. Based on reports provided to the user device via the analytics system 208, a user can gain insight about customers, products, and/or business trends. The information used to provide these reports is often collected via digital marketing that collects data from websites and/or mobile applications from customers or consumers. A user can view reports in a natural progression where information in one report can prompt the user to analyze further data in additional reports.

Recommendation system 210 generally provides recommendations to a user based on current context and predicted user intent, for instance, utilizing user history of interactions with the analytics system 208. Recommendation system 210 can be trained via machine learning using a supervised learning algorithm, such as, for example, tensor factorization matrix and ranking (e.g., rankSVP). At a high level, recommendation system 210 can be trained to infer user intent. Such intent can be based on a user's history of interaction with analytics system running, for example, on application 212.

As described herein, historical interactions with analytics data, such as data reports, can be used to generate a user intent model that infers user intent. As such, training a recommendation system to infer user intent can analyze user navigations from report to report using, for example, an analytics system (e.g. analytics system 208). In particular, user interactions with the analytics system can be tracked to analyze how a user progresses through reports during an analytics session. For example, if a user consistently views a product web page and then immediately views the revenue associated with that product, the recommendation system can be trained to utilize this pattern in its recommendations to that user. In this way, user history to can be used train a recommendation system that can make recommendations to a user by suggesting reports to view or suggesting that the user should run a particular tool based on a model developed in accordance with a user's previous interactions with an analytics system.

To encourage a user to explore other reports, user history of interactions with the analytics system can be supplemented using interactions from other users to broaden the recommendations made to the current user. Accordingly, recommendations can be provided to a user based on what other users have done (e.g., in similar situations to the current user). One way in which recommendations can be broadened is by incorporating interactions based upon interactions by users with a greater experience level than the current user. For example, intermediate users of a systems can be given suggestions based on the user history of expert users. To this end, a learning curve can be built into a recommendation system allowing the complexity of a user's interaction with an analytics system to grow over time. In this way, user history of interactions can be used to determine a user intent model that the recommendation system can utilize when making recommendations.

For cloud-based implementations, the instructions on server 206 may implement one or more components of analytics system 208 and/or recommendation system 210. Application 212 may be utilized by a user to interface with the functionality implemented on server(s) 206, such as analytics system 208 and/or recommendation system 210. In some cases, application 212 comprises a web browser. In other cases, server 206 may not be required, as further discussed with reference to FIG. 3.

Thus, it should be appreciated that analytics system 208 and/or recommendation system 210 may be provided via multiple devices arranged in a distributed environment that collectively provide the functionality described herein. Additionally, other components not shown may also be included within the distributed environment. In addition, or instead, analytics system 208 and/or recommendation system 210 can be integrated, at least partially, into a user device, such as user device 202a. Furthermore, analytics system 208 and/or recommendation system 210 may at least partially be embodied as a cloud computing service.

Figure 3:
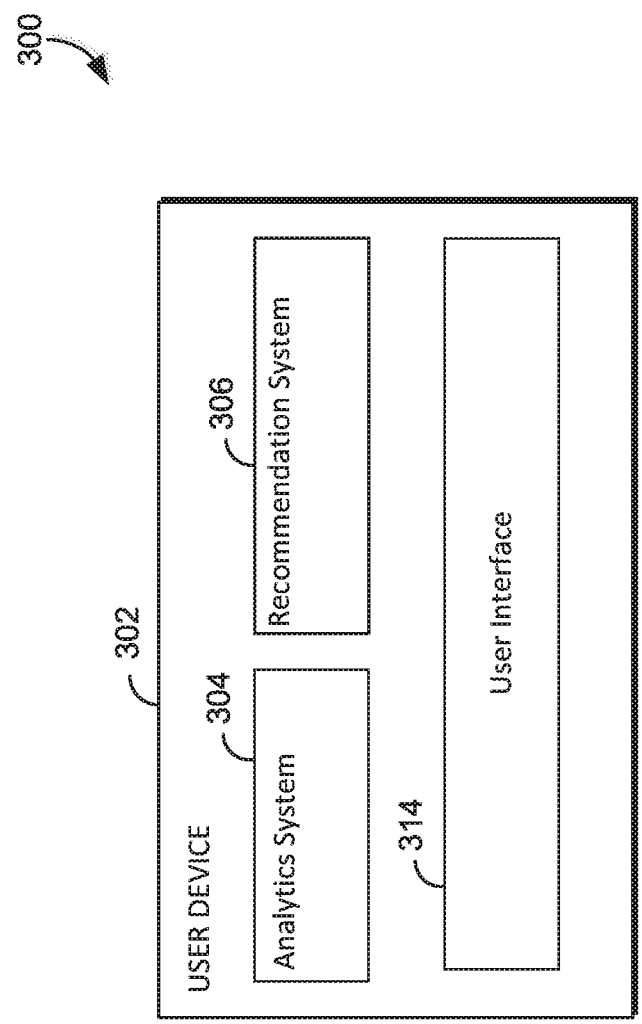
FIG. 3 depicts an example configuration of an operating environment in which some implementations of the present disclosure can be employed, in accordance with various embodiments of the present disclosure.

Referring to FIG. 3, aspects of an illustrative analytics system and recommendation system are shown, in accordance with various embodiments of the present disclosure. The components of analytics system 304 and/or recommendation system 306 may be implemented completely on a user device, such as user device 302. In other embodiments, either one of, or both, analytics system 304 and recommendation system 306 may be implemented using instructions on a server. In this way, instructions for analytics system 304 and/or recommendation system 306 may reside on a server but be accessible by a user via, for example, user interface 314. It should be appreciated that while analytics system 304 and recommendation system 306 are depicted as separate systems, in implementations, the systems can be combined and/or have their functionality run using additional systems.

Analytics system 304 can provide reports and/or analytics from a specialized business intelligence or analytics product. One exemplary product is Adobe Analytics®. In such a product supported by an analytics system, a user can gain insight about customers, products, and/or business trends based on various reports. A user can access such an analytics system using, for example, user interface 314.

Recommendation system 306 can provide recommendations for a user based on current context and predicted user intent utilizing user history of interaction with analytics data (e.g., analytics reports). Such a recommendation system can be trained using machine learning via a supervised learning algorithm. Recommendations provided by recommendation system 306 can be displayed to a user using, for example, user interface 314.

Figure 4:
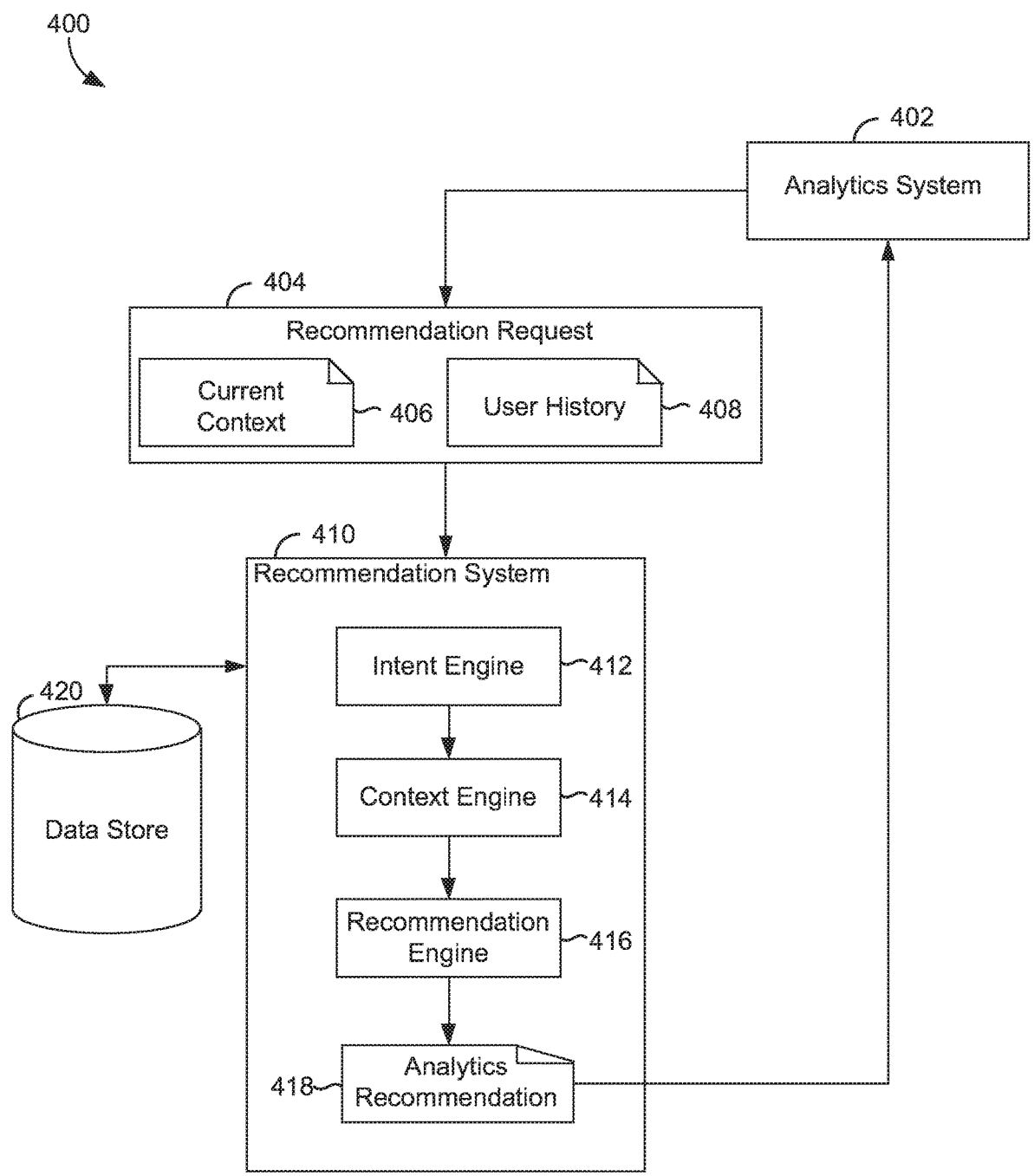
FIG. 4 illustrates interactions between an exemplary analytics system interacting with an exemplary recommendation system, in accordance with various embodiments of the present disclosure.

Turning now to FIG. 4, FIG. 4 provides an illustrative recommendation environment for providing a recommendation to a user utilizing an analytics system, in accordance with embodiments of the present disclosure. Data store 420 can store computer instructions (e.g., software program instructions, routines, or services), data, and/or models used in embodiments described herein. In some implementations, data store 420 stores information or data received via the various components of recommendation system 410 and provides the various components with access to that information or data, as needed. Additionally, data store 420 may store information or data sent by analytics system 402 to recommendation system 410. Although depicted as a single component, data store 420 may be embodied as one or more data stores. Further, the information in data store 420 may be distributed in any suitable manner across one or more data stores for storage (which may be hosted externally).

In embodiments, data stored in data store 420 includes training data. Training data generally refers to data used in machine learning, or portion thereof. As such, training data can include user history of interactions with an analytics system and context factors associated with the analytics system. In some cases, data can be received by analytics system 402 and/or recommendation system 410 (e.g., user history and/or current context of a user operating a user device 202a or another device associated with the user, via, for example, application 210). In other cases, data can be received directly from user devices or from one or more data stores in the cloud.

Data store 420 can also be used to store information about recommendation system trained for a particular user. Because recommendation system 410 can be tailored to an individual user during training so that recommendations are specific to the user, a specifically trained recommendation model can be accessed via the data store and run using recommendation system 410. Such a trained recommendation model can be comprised of one or more models that incorporate aspects specific to a particular user, such as, for example, a personalized user intent model and a personalized context model.

Analytics system 402 can provide reports and/or analytics from a business intelligence or analytics program(s). In such a program supported by an analytics system, a user can gain insight about customers, products, and/or business trends based on various reports viewed by the user. Within an analytics program, a user may desire to receive recommendations about what reports (e.g., charts) to analyze and/or an analytical tool(s) to execute. As such, a recommendation system, such as recommendation system 410, can provide predictive recommendations. Such a recommendation system is capable of facilitating user proficiency with an analytics product and/or helping new users become more familiar with the product more quickly. To provide recommendations, the recommendation system is generally trained to predict user intent based on user history of interactions with an analytics system and identify context of content currently accessed by a user.

In this way, to initiate providing a recommendation(s), the analytics system 402 can send recommendation request 404 to recommendation system 410. In some cases, a recommendation request may be automatically triggered. For instance, recommendation request 404 can be activated when, for example, a user launches recommendation system 410. As another example, a request can be launched when a user selects to open a virtual assistant, or recommendation system, for an analytics system. In other cases, a recommendation request may be triggered in response to a user selection. For example, a recommendation request may be initiated when a user clicks a "recommend" or "help" button. A user may specify a request for a recommendation, for instance, when the user is interested in suggestions regarding his or her analysis or desires assistance refining understanding of the analytics system.

A recommendation request from analytics system 402 can include information pertaining to the user utilizing the analytics and/or recommendation system. Such information can include current context 406 and/or user history 408. Current context 406 can refer to what a user can currently view (e.g., data within a report). User history 408 can include what features a user uses, what data the user accesses, what data the user has accessed in the past, and features the user has accessed. As such, user history represents the historic usage of the analytics system by a particular user. Alternatively, user history can include historic usage of the analytics system by users other than the current user. This is particularly helpful for novice users that do not have an adequate user history to train a useful recommendation system. In addition, supplementing the user history of a user with user histories from other users can diversify the recommendations provided by the recommendation system that can broaden the current user's analysis and/or understanding of data within the analytics system.

Recommendation system 410 can include intent engine 412, context engine 414, and recommendation engine 416. The foregoing components of recommendation system 410 can be implemented, for example, in operating environment 200 of FIG. 2 and/or operating environment 300 of FIG. 3. In particular, these components may be integrated into any suitable combination of user devices 202a and 202b through 202n, and server(s) 206 and/or on user device 302.

Intent engine 412 of recommendation system 410 is generally configured to infer or predict intent of a user. As described herein, user intent is generally inferred without requiring a user to input a query indicating intent. The user intent generally refers to an unanswered question to which the user desires an answer. In embodiments, intent refers to viewing a particular report or set of reports, for example, in which data can be viewed.

As previously described, user intent can be inferred utilizing user interaction history with an analytics system, such as one or more reports presented to a user via an analytics program. As such, user interactions associated with analytics data (e.g., analytics reports) can be tracked and collected. In one embodiment, the intent engine 412 can compile user history by generating a user navigation graph for a user. A user navigation graph depicts analytics data (e.g., reports) that a user has visited to understand the progression of how the user views reports and types of data during an analysis session. In this way, a user navigation graph can be unique or tailored for each user of, for example, analytics system 402. Creating such a graph allows the recommendation system to incorporate a frequency-based recommendation aspect when making recommendations to a user. As such, a user navigation graph for a user can be a weighted directed graph where each node signifies an individual report viewed by that user, and each directed edge between the nodes of the graph signify that the user transitioned between nodes with probability being greater than zero. The weight of such edges reflects the frequency of transition between two such nodes. For example, if a user transitions from a product webpage report to the product sales report, this will be reflected by the weight of the edge between the node representing the product webpage report and the node representing the product sales report. Thus, this weight represents the historic frequency of transitions from one node to another node. Modeling analytics system usage can also be performed using a Markov model.

Attributes of reports, or nodes, input into intent engine 412 can be determined. Attributes of reports can be included in the user navigation graph. Attributes of a node can include key, report name, type of report, node-type, mass, and/or target. Key can reflect the format of the node, such as, <Report ID; Metrics of report seen>. The Report ID can be a unique identification that denotes the exact report viewed by a user. "Metrics of report seen" can include metrics present in a report. For instance, these metrics can be the type of dual information stored as a feature of an analytics system such as, for example, Adobe Analytics®, which allows multiple metrics to be displayed in the same report. Report name can be a placeholder for the report name. Type of report can be a placeholder for the type of report viewed by a user. Such types of reports can include, trended, ranked, graphical, and tabular. Node-type can record the value "report" when a user views a simple report or "other" when the user views tools, such as, single page applications and/or page that are not reports. Mass can hold a floating point value where the mass of a node is the fraction of the total browsing time of a user that the user spends on a particular node (e.g., a particular report). Such an attribute can denote weighing a score down so that, if a mass of a node is relatively high, the user can be weighted down if the user spends more time at that node when compared to other nodes. Target can be a binary attribute set to either zero or one indicating whether a node is designated as a target node, as discussed below.

Upon generation of a user navigation graph, intent engine 412 can identify target nodes. A target node refers to a possible user intent candidate, such as, for example, a candidate report a user may desire to view. To this end, determining target nodes can refer to inferring intent of a user where intent is the likelihood that the user would like to view particular data (e.g., a data chart) based on progression between data or reports in the past. Identifying target nodes can shed light on the intent behind a user's actions during navigation from node to node. In this way, a target node can refer to a candidate node that a user could visit, specifically, a node identified based on the structure of the user navigation graph and the sequence analysis. Target nodes can indicate what node will fulfill an unanswered question a user has in their mind during a session of analysis as the user explores data to answer the unanswered question. Target nodes can be based on frequent activity and/or sequence navigation patterns and as such, indicate likely nodes a user will view during an analysis.

In one embodiment, to identify target nodes, if a given node has in-degree greater than or equal to the mean of the in-degrees of all nodes, then the target attribute of the node is set to 1. As mentioned above, the target attribute can be a binary attribute set to either zero or one indicating whether a node is designated as a target node. Such an analysis results in at least one target node, even in the smallest of graphs, due to the inherent property of the statistical mean, which ensures that at least one node will be identified as a target node. In this way, target nodes can be denoted by setting the target attribute of the node to 1.

Context engine 414 is generally configured to identify or determine context such that context-based recommendations can be provided. In this regard, the recommendation system 410 can be trained to make recommendations based on the current context of a user. To provide context-based recommendations, the context engine 414 can generate a context model that models the current context. As described above, current context refers to what a user views (e.g., data within a report). Context can be represented as a context vector where the context vector is based on a particular user, for a particular type of report. A context model can be generated by aggregating context vectors across users and reports to generate a context tensor. This context tensor can be factored to give a more simple representation that can be used by the trained recommendation system to generate recommendations. Such factorization can be performed using a tensor factorization matrix, a technique allowing for machine learning predictions in a particular area.

Context factors can be thought of as more simple representations of the reports or analytics data a user has viewed. To model context from a report, such as, for example, a report currently being analyzed by a user, features of the report can be extracted. Such extracted features can differ based on the type of report being viewed by the user. For trended reports, for example, aggregate value, maximum and minimum values of the time series, location of maximum and minimum observations, longest positive and negative runs, length of time series, and aggregate absolute change in consecutive observation can be extracted. A trended report depicts time series data (e.g., the revenue for a particular product for California for the various months of last year). Alternatively, for ranked reports, for example, only the aggregate value may be used. A ranked report depicts histogram data (e.g., a way to represent and visualize revenue across the states in the United States for a particular product).

For a user, there is a set of different dimension elements over which a metric can be calculated. The cardinality of such a set for each metric m can be denoted as $d_m$. A context vector, $D_u$, can be determined for a report based on the metrics of the report; $D_u = \Sigma_{m=1}^{M_u} d_m$ where $M_u$ is the cardinality of the set of all metrics seen by a user. For each report there are up to six observable features. In this way, the dimension of the context vector can be $6 \times D_u$ which can be denoted as $N^u$. Each trended report can consist of time series of metrics for different dimension elements for a given time period. As such, all six values can be populated for a trended report. For a ranked report, only one value, the aggregate value, can be populated, with all the remaining positions assigned a value of zero to indicate they are not present in the report. The aggregation of such context vectors over the number of reports seen can form a context matrix with dimensions of $N^u \times T$ where $N^u$ can signify context variables that vary from user to user and T signifies the number of reports viewed.

Combining such content matrices from different users results in a context tensor consisting of context matrices of U users. This context tensor can be constructed for clusters of users. For all users in a cluster, the reports seen can be repeated so that the total number of reports seen is equal to the maximum number of reports viewed by any user. PARAFAC2 tensor decomposition can be used to obtain latent factors for each report seen by a user because the tensor is highly sparse and the number of context features varies from user to user. Kalman Filter can then be used to sequentially evolve latent factors from the previous iteration of the PARAFAC2 tensor decomposition.

To distinguish between latent factors with intent I and latent factors without intent I, RankSVM can be used to perform a pair-wise learning-to-rank method. Based on training data, there is a set $R_1$ consisting of all latent factors $f_i$ such that the user can end up at target node I during a session. There can also be set $R_2$ consisting of all latent factors $f_j$ such that the user does not end up at target node I in a session, in other words, the user ends up at a target node different from I. RankSVM can be used to determine a hyperplane based on training data that separates positive and negative examples. In this way, for every report in the test data, a dot product of corresponding latent factor ($\vec{f}$) for that report and the hyperplanes gives an intent score denoted as $S_I(\vec{f})$. In this way, a context model using context factors can be determined that a trained recommendation system can use to make recommendations based on current context.

Upon training the recommendation system based on user intent and current context, that is, training user intent and context models, recommendation engine 416 of recommendation system 410 can be used to determine recommendation scores for candidate recommendation nodes. In this way, recommendation engine 416 can utilize intent and context as determined by intent engine 412 and context engine 414 so that recommendation system 410 can provide accurate recommendations to a user without the user providing a specific query.

In one embodiment, to provide recommendations, recommendation engine 416 can combine intent, using, for instance, a user intent model, and context, using, for instance, a context model, as determined by intent engine 412 and context engine 414, respectively. In implementation, to generate recommendation scores for candidate target nodes, the recommendation engine combines the current context of a user with the user intent model using information from the user navigation graph. An exemplary equation for doing this can be denoted by the following formula:

$$K_{uv} = \alpha_v * W_{uv} * R_v + \beta_v * M_v \quad \text{(Equation 1)}$$

$K_{uv}$ can indicate a recommendation score. $W_{uv}$ is the historical transition probability of a user going from current node, u to a recommended target node, v, taken from the user navigation graph. $R_v$ is the relevance score of a recommended target node, v. This score can be a function of the intent scores and the probabilistic distance from the node v to the set of target nodes based on the user navigation graph. Such a distance can be that of the most probable path from node v to each target node. Once such manner for determining such a distance can be using Dijkstra's shortest path algorithm; for example, the algorithm can be applied to the negative of the logarithm of the transition probability between two nodes in the user navigation graph. $M_v$ can represent the fraction of the total browsing time of a user for which the user spent on recommended target node v and can be termed as the mass ($M_v$) of recommended target node v. The $\alpha_v$ and $\beta_v$ parameters can be used to determine weights of individual terms in the recommendation score. Such parameters can be set to 1.0 and amplified based on user feedback regarding a particular recommendation provided by the recommendation system. In this way, if a user is not satisfied with recommendations made by the recommendation system, the user can provide feedback that will further train the system. For instance, $\alpha_v$ can be used to balance the trade-off between the historic transition probability and the intent score representing current context and $\beta_v$ can be used as an offset.

Such a recommendation can be made based a ranked list of suggested reports and/or tools to apply as determined by recommendation engine 416. In this way, recommending a recommended target node v to the user who has most recently accessed node u can be based on the following preference order, each in decreasing fashion: $K_{uv}$ using Equation 1, whether preference is given to recommendations from the user's user intent model over other users' user intent models, $R_v$ the relevance score, $W_{uv}$ the historical transition probability, and $M_v$ the fraction of time spent on node v. Alternatively, recommendations can be based on frequency where they are based on a probabilistic graphical model, i.e., based upon edge weights in the user navigation graph. Recommendations can also be made based on mass, where they are based on the average time spent on the reports seen, context where they are based on intent scores obtained from the current context of the user Further, recommendations can use tensor factorization based on obtaining latent factors only from PARAFAC2 tensor decomposition without Kalman Filer regularization. Recommendations can also be made using latent factors only from PARAFAC2 tensor decomposition with Kalman Filer regularization.

Such recommendations can also be ranked into an ordered list by recommendation engine 416. This can be performed using, for example, Equation 1. Alternatively, $R_v$ the relevance score of Equation 1, can be set to the maximum of intent scores*distance to target node where vectors are multiplied element-wise and then the maximum of the products is taken. $R_v$ can also be set to the dot product between intent score and distances of nodes to those intents, where the dot product is performed between the two vectors to generate a numerical value. Additionally, $R_v$ can be set to the maximum of intent scores, and/or sum of proposed intent scores.

Analytics recommendation 418 can present the compiled list of recommended reports and or tools to use on data at various times as determined at recommendation engine. Tools can be used to detect changes in metrics and dimensions of data. The analytics recommendation can also include metrics and dimensions related to the reports recommended to the user from the recommendation engine.

Figure 5A:
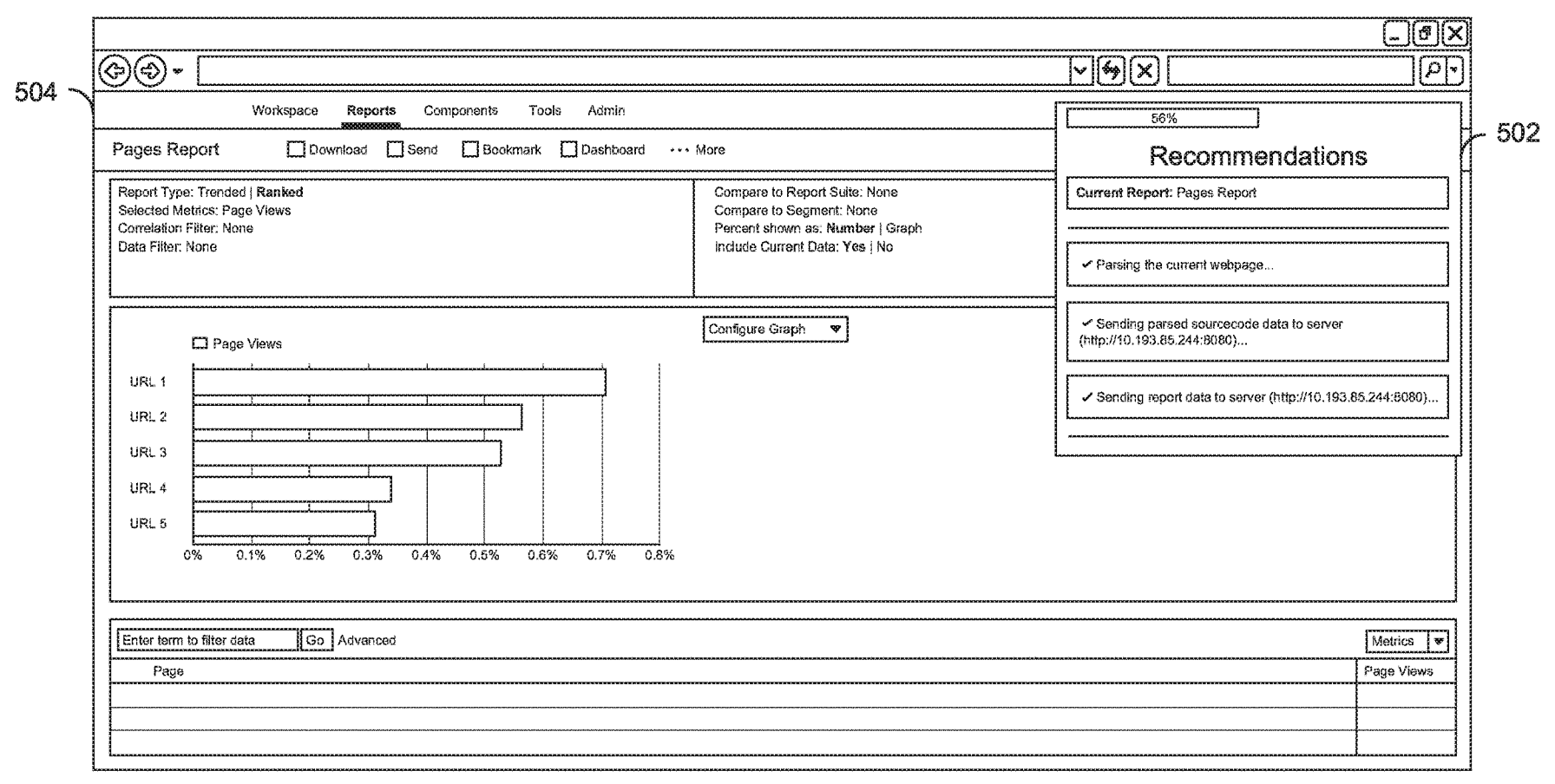
Figures 5B, 5C:
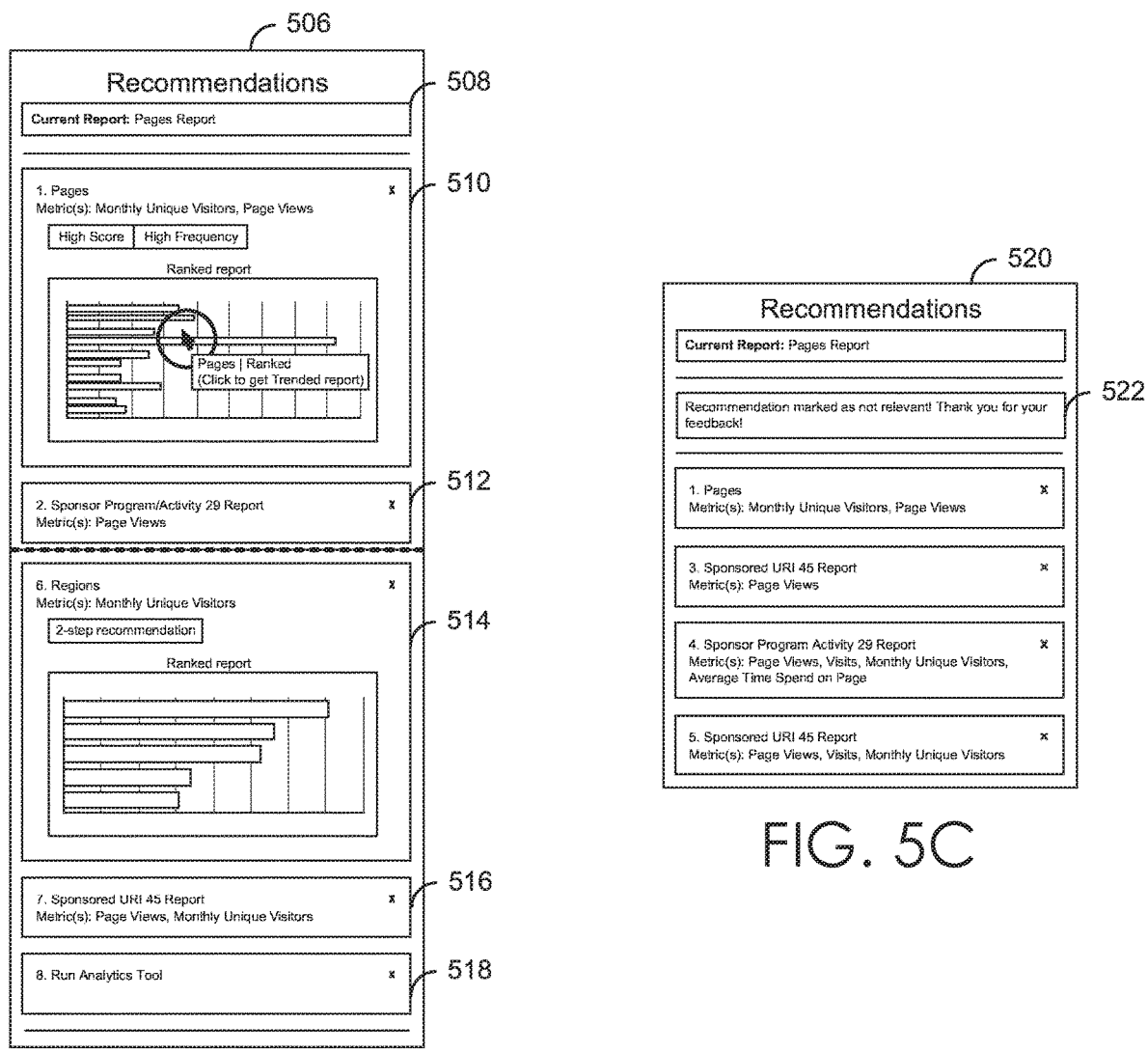
FIG. 5B depicts an illustrative GUI of a recommendation system, in accordance with various embodiments of the present disclosure.
FIG. 5C depicts an illustrative GUI of a recommendation system, in accordance with various embodiments of the present disclosure.

FIGS. 5A-C depict illustrative graphical user interfaces (GUIs) of a recommendations component for a recommendation system, in accordance with various embodiments of the present disclosure. FIG. 5A depicts an embodiment of a recommendations component in conjunction with an analytics component. As illustrated, a recommendation zone, recommendations component 502, is shown as loading a recommendation based on the current analytics report opened in analytics component 504. Such a recommendation component can utilize information parsed from the current page open in the analytics component (e.g., the current webpage). Such parsed source code data can be sent to a server along with data from the currently opened report where the data can be used as part of the information used to form preemptive recommendations using a trained recommendation system as previously discussed.

FIG. 5B depicts an embodiment of the recommendations component with an output recommendation. When displaying recommendations 506, a recommendation zone, recommendations component, can display what current report 508 was open when the recommendation was made. As depicted, display of the current report 508 indicates that the recommendation was made based on the current report being a pages report. Recommendations provided via a recommendations component can be ordered based on a recommendation score, where the recommendation with the highest score is the first recommendation. As illustrated, recommendation 510 is the recommendation with the highest score, recommending that the user view another pages report. Additional aspects that can be presented in recommendation 510 include metrics analyzed when making the recommendation. Metrics can include attributes of a report such as page views or revenue that can be used to represent attributes of a report, for example, the name of a report. Recommendation 510 indicates that the metrics analyzed include monthly unique visitors and page views. Other aspects that can be presented in recommendation 510 include indications, such as a label, that a recommendation was based on an extremely high score and/or that a report is viewed with high frequency when recommended. Recommendation 510 is depicted as an expanded recommendation, however, in other embodiments, recommendations can be presented similarly to recommendation 512. Upon a user clicking on a recommendation, it can be expanded from the form depicted in recommendation 512 to that of recommendation 510, showing a preview of the recommendation and/or further information linked to the recommendation (e.g., high score, high frequency, or 2-step recommendation). When a user clicks on a recommendation, the recommendation can be loaded or carried out depending on whether the recommendation is a report to view or a tool to run. Recommendation 514 depicts another recommendation where the recommendation indicates that it is a 2-step recommendation meaning recommendations component has provided two related recommendations (e.g., open a particular report and then run an analytics tool on that report or open a particular report and then open a second related report). Recommendation 516 depicts a further recommendation. Recommendation 518 illustrates that recommendations component 506 can recommend analytics tools to run on data within the analytics system.

FIG. 5C depicts an embodiment of the recommendations component indicating a user can provide feedback based on the recommendations. When a user believes that a recommendation provided by recommendations component 520 is not relevant, the user can provide feedback to further train the recommendation system that the recommendation was not relevant. Feedback remark 522 depicts that a user has indicated that a particular recommendation was not relevant. In response to such feedback, recommendation system will be updated so that future recommendations provided via recommendations component 520 will take into account that a user did not find a particular report relevant.

Figure 6:
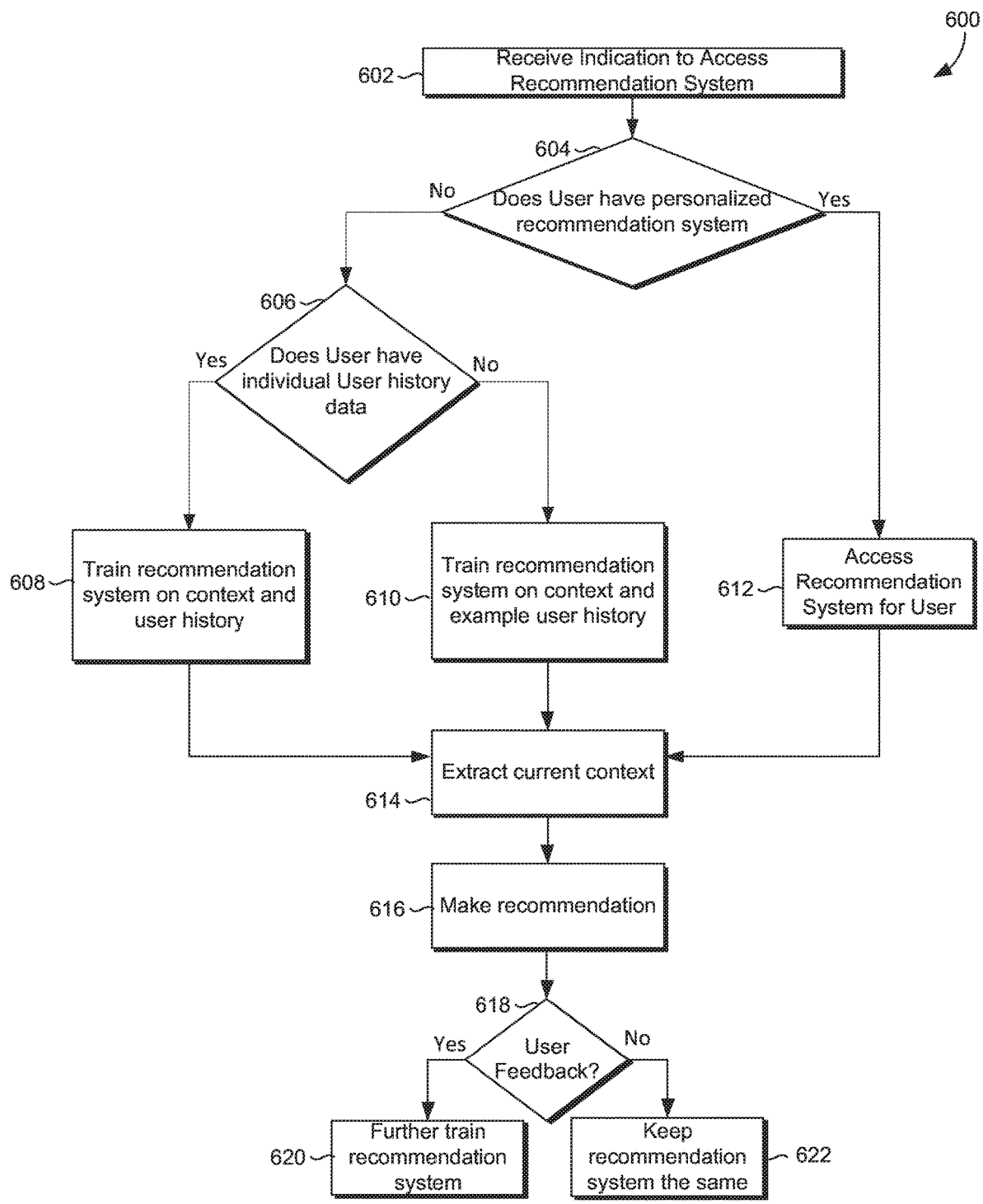
FIG. 6 illustrates a process flow for training and using a recommendation system to generate recommendations based on current context and user intent, in accordance with embodiments of the present invention.

With reference to FIG. 6, a process flow shows an embodiment of method 600 for training and using a recommendation system to generate recommendations based on current context and user intent, in accordance with embodiments of the present invention. Method 600 can be performed, for example, by recommendation system 210, 306, and/or 410 as illustrated in FIGS. 2-4.

As depicted, process flow 600 begins at block 602 where an indication is received to access a recommendation system. Such a recommendation system can provide recommendations for a user based on current context and predicted user intent utilizing user history of interaction with a program, such as, for example, an analytics system. Such a recommendation system can be trained using machine learning via a supervised learning algorithm. Recommendations provided by a recommendation system can be displayed for a user using, for example, a user interface.

At block 604, a determination is made as to whether the user accessing the recommendation system has a personalized recommendation model. Such a personalized recommendation model can be a recommendation model trained using a user intent model specific to the user accessing the recommendation system where the user intent model is determined using a user history of interaction by the user with an analytics system. The analytics system can provide reports and/or analytics from a specialized business intelligence or analytics product. Such a product can be, for example, Adobe Analytics®. If it is determined that a user has a personalized recommendation system at block 604, process 600 progresses to block 606. If it is determined that a user does not have a personalized recommendation system at block 604, process 600 moves to block 612, as will be discussed detail below.

At block 606, a determination is made as to whether the user accessing the recommendation system has individual user history data sufficient to adequately train the recommendation system to provide recommendations based on user intent, as determined using user history. If it is determined at block 606 that the user has individual user history data, process 600 continues to block 608. If it is determined at block 606 that the user does not have individual user history data, process 600 progresses to block 610.

At block 608, a recommendation system can be trained based on user history to determine user intent. This training can include the process as described with reference to FIG. 4. For instance, a user's user history can be analyzed to determine a user intent model. Additionally, context features within the analytics system can be used to determine a context model. Upon such determinations, a recommendation model can be generated that provides analytics recommendations personalized to the user accessing the recommendation system.

At block 610, a recommendation system can be trained based on example user history, i.e. historic usage of the analytics system by users other than the current user. This can be implemented by analyzing users of the analytics system and grouping them into categories based on experience: addicts, expert, mediocre, and novice. Such grouping can be performed using, for example, k-means clustering algorithm. Addicts can be identified as users who view an exceptionally high number of unique reports and have a high level of user history interactions. Expects can be identified as users who have a good understanding of the analytics system and have a high level of user history interactions. Mediocre users can be identified as users who have a good understanding of the analytics system and a low level of user history interactions. Novice users can be identified as users who have little to no understanding of the analytics system and a low level of user history interactions.

Information about interactions with an analytics system can be gathered, for example, over a several day period. Such gathered information can be filtered and sorted to isolate data useful for training a recommendation system, such as, determining statistics of each user of each company. These statistics can include parameters for each user like number of unique reports, number of total reports seen, average time spent on a report, number of trended reports, and number of ranked reports. Extreme users can be removed, such as users who are classified as ultra-specialized or passerby users. As mentioned above, a k-means algorithm can then be used to group users into appropriate groups based on experience. In addition, user history data was cleaned and enriched so that the data left can adequately train the recommendation system. This included ensuring the presence of attributes for each report views and/or splitting user data into separate sessions when necessary based on the assumption that an analysis session ends if there is user inactivity over a predetermined time period, for example, 30 minutes. Upon gathering such information, a recommendation system can be trained to determine a user intent model using the process as described with reference to FIG. 4.

Creating a recommendation system using example user history is particularly helpful for novice users that do not have an adequate user history to train a useful recommendation system. In addition, an individual user's user history can merely be supplemented using user histories from other users to diversify the recommendations provided by the recommendation system.

Additionally, at block 610, context features within the analytics system can be used to determine a context model. Upon such determining a user intent model and context model, a recommendation system can be generated that provides analytics recommendations personalized to the user accessing the recommendation system.

At block 612, a previously trained recommendation system can be accessed to make a recommendation to the user based on intent, as determined using user history, and current context. Training of such a recommendation system can include the process as described with reference to FIG. 4.

Once a recommendation system is trained for a user, it can be used to make recommendations to a user. Such a recommendation system can have been trained as described with reference to block 608 or 610, or, alternatively, a previously trained system can be used, such as at block 612. As such, at block 614, current context of an analytics system is extracted. Such a current context can be input into the recommendation system that was trained using the user intent model and the context model. Current context can include the current report accessed by the user and variables attached to the report.

Moving on to block 616, a recommendation can be made by the recommendation system. Such a recommendation can be presented in list form, for instance, a list of recommended reports and/or tools to run. In embodiments, recommendation system can also provide recommended metrics, dimension and/or segments for the user to explore. Further, such a system can recommend insights such as anomalies and/or trends related to data. Reports recommended by the recommendation system can be ranked in an order so that the first report is determined to be the most pertinent to the user. This can be performed using determinations as discussed with reference to recommendation engine 416 of FIG. 4.

At block 618, a determination is made as to whether there is any user feedback related to the recommendation as made at block 616. When it is determined at block 618 that there is user feedback related to the recommendation, process 600 moves to block 620 where the recommendation system is further trained to incorporate the user feedback. When it is determined at block 618 that there is not user feedback related to the recommendation, process 600 moves to block 622 where the recommendation system does not undergo any further training.

Figure 7:
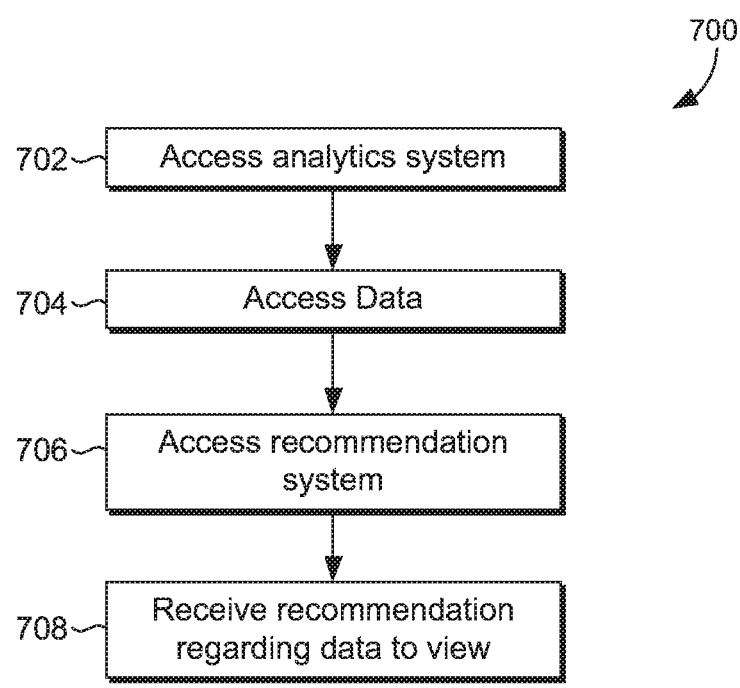
FIG. 7 illustrates a process flow depicting an example of a trained recommendation system providing a recommendation in conjunction with an analytics system, in accordance with embodiments of the present invention.

FIG. 7 illustrates a process flow depicting an example of a trained recommendation system providing a recommendation in conjunction to an analytics system, in accordance with embodiments of the present invention. Method 700 can be performed, for example, by analytics system 208, 304, and/or 404 and recommendation system 210, 306, and/or 410 as illustrated in FIGS. 2-4.

At block 702, an analytics system can be accessed. Such an analytics system can provide reports and/or analytics from a specialized business intelligence or analytics product. The analytics system can be used to view data in the form of charts and/or reports.

As such, at block 704, data can be accessed. Accessing data can be accomplished, for example, by a user opening a report containing data. Such report can include time series reports and histogram reports, however, it should be appreciated other forms of reports can also be used to display data. Beyond depicting data, these reports can also include variables attached to the report such as dimension, metrics, and associate aggregate data.

Upon accessing data, for example, in the form of a report, a recommendation about further analysis using the analytics system can be desired. As such, at block 706, a recommendation system can be accessed. Such a recommendation system can be trained for the individual user using the analytics system or can be trained using other training data if the user of the analytics system does not have sufficient user history to train a helpful recommendation system. Such a recommendation system trained to learn the intent of the user of the analytics system and based on current context provided from the data accessed at block 704, a recommendation can be received at block 708 regarding what data the user should view subsequent to the currently accessed data.

Figure 8:
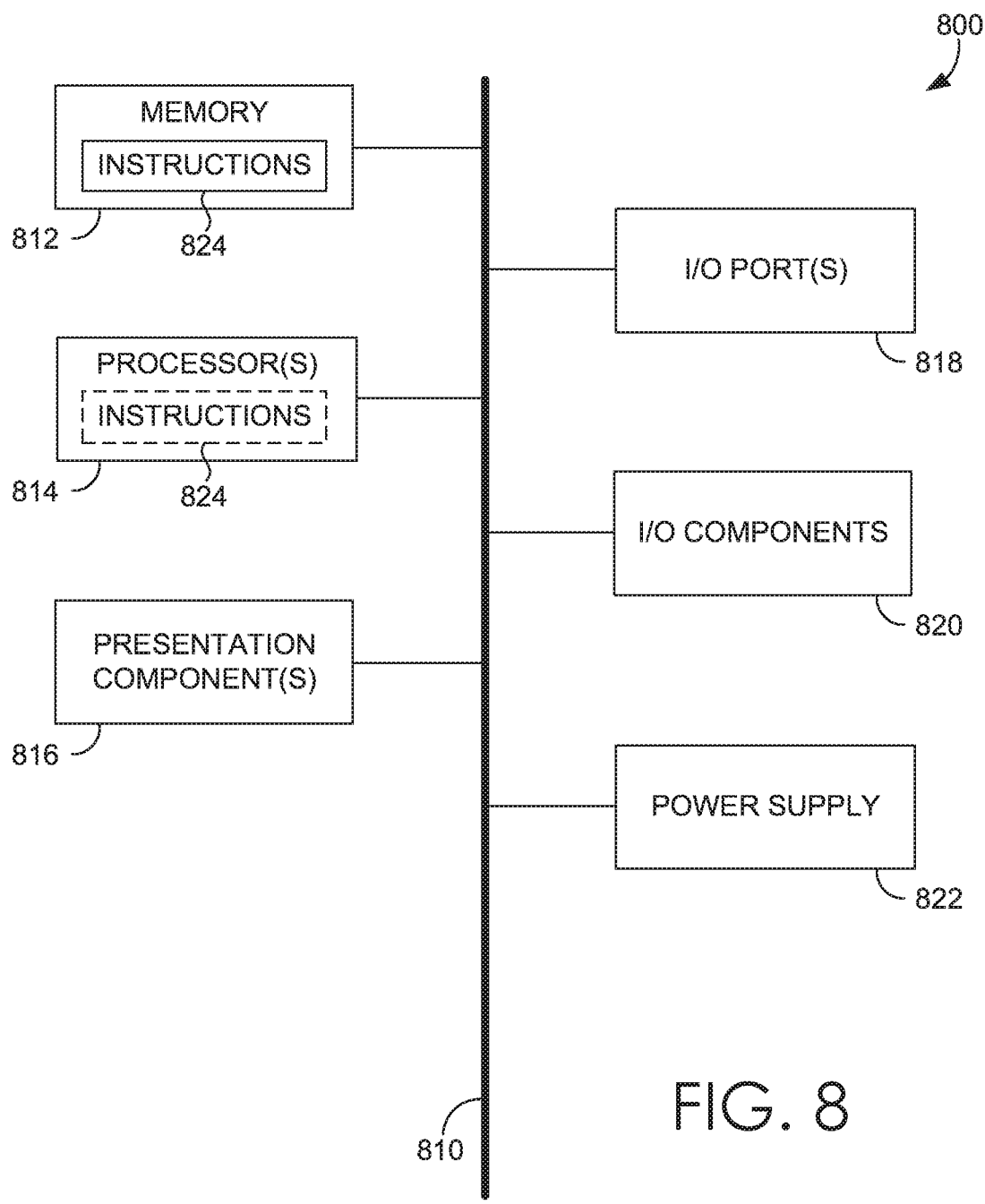
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for generating recommendations, comprising:
    inferring a user intent to view a set of data based on a user history of interactions with an analytics system;
    determining a context associated with an analytics report currently being presented via a user interface; and
    generating one or more recommendations of analytics data to view based on the determined context and inferred user intent.

2. The computer-implemented method for making recommendations of claim 1, the method further comprising:
    presenting the one or more recommendations as an ordered list, the ordered list including at least one of a report to view and a tool to run, wherein the ordered list is organized using recommendation scores.

3. The computer-implemented method for making recommendations of claim 2, the method further comprising:
    displaying the ordered list of the one or more recommendations in a graphical user interface configured to view recommendations, wherein the ordered list is displayed in a recommendation zone of the graphical user interface; and
    receiving input from a user indicating a desire to interact with an item of the ordered list; and
    in response to the input, enabling user interaction with the item of the ordered list.

4. The computer-implemented method for making recommendations of claim 3, wherein the user interaction is at least one of previewing the item of the ordered list using the recommendation system, accessing the item of the ordered list using the analytics system, applying the item of the ordered list within the analytics system, and sending feedback regarding the item of the ordered list to the recommendation system.

5. The computer-implemented method for making recommendations of claim 1, wherein the context is at least one of the analytics report currently being presented, variables attached to the analytics report currently being presented, and data associated with the analytics report currently being presented.

6. The computer-implemented method for making recommendations of claim 1, wherein inferring the user intent includes:
receiving the user history of interactions;
generating a user navigation graph using the user history, wherein the user navigation graph is comprised of nodes, each node representing a particular report provided by the analytics system, wherein the nodes are connected by edges, the edges representing a transition from one node to another node; and
determining target nodes, wherein a target node indicates a report the recommendation system predicts the user will want to view during an analysis session.

7. The computer-implemented method for making recommendations of claim 6, wherein the user history of interactions can be at least one of: user history of interactions from a user accessing the recommendation system, exemplary user history of interactions from a different user other than the user accessing the recommendation system, and user history of interactions from the user accessing the recommendation system supplemented by exemplary user history of interactions from the different user other than the user accessing the recommendation system.

8. The computer-implemented method for making recommendations of claim 1, wherein determining the context includes using a generated matrix of content features present in the analytics system.

9. A non-transitory computer-readable storage medium including instructions which, when executed by a computer, cause the computer to perform operations comprising:
causing a display of a graphical user interface configured to view recommendations regarding an analytics system, the graphical user interface including a recommendation zone; and
causing a display of an analytics recommendation in the recommendation zone, wherein the analytics recommendation is generated using inferred user intent to view a set of data based on a user history of interactions with an analytics system and determined context associated with an analytics report currently being presented by the analytics system.

10. The non-transitory computer-readable storage medium of claim 9, further comprising:
receiving input from a user indicating feedback regarding the item of the analytics recommendation; and
adjusting the recommendation system to incorporate the feedback.

11. The non-transitory computer-readable storage medium of claim 9, further comprising:
receiving input indicating a desire to interact with an item of the analytics recommendation, wherein the analytics recommendation includes an ordered list of the one or more recommendations, wherein the one or more recommendations includes the item of the analytics recommendation; and
in response to the input, enabling interaction with the item of the analytics recommendation.

12. The non-transitory computer-readable storage medium of claim 9, wherein the determined context is at least one of a currently accessed report, variables attached to the currently accessed report, and data associated with the currently accessed report.

13. The non-transitory computer-readable storage medium of claim 9, wherein the interaction is at least one of previewing the item of the analytics recommendation using the recommendation zone, accessing the item of the analytics recommendation using the analytics system, and applying the item of the analytics recommendation within the analytics system.

14. The non-transitory computer-readable storage medium of claim 9, wherein determining the inferred user intent includes:
receiving the user history of interactions;
generating a user navigation graph using the user history, wherein the user navigation graph is comprised of nodes, each node representing a particular report provided by the analytics system, wherein the nodes are connected by edges, the edges representing a transition from one node to another node; and
determining target nodes, wherein a target node indicates a report the recommendation system predicts a user will want to view during an analysis session.

15. The non-transitory computer-readable storage medium of claim 9, wherein the user history of interactions can be at least one of: user history of interactions from a user accessing the recommendation system, exemplary user history of interactions from a different user other than the user accessing the recommendation system, and user history of interactions from the user accessing the recommendation system supplemented by exemplary user history of interactions from the different user other than the user accessing the recommendation system.

16. The non-transitory computer-readable storage medium of claim 9, wherein the determined context utilizes a generated matrix of content features present in the analytics system.

17. A computing system comprising:
means for generating one or more recommendations related to analytics data being displayed, the one or more recommendations based a current context associated with the analytics being displayed to a user and a user intent inferred via a user history of interactions with an analytics system; and
means for providing the one or more recommendations for presentation, the one or more recommendations including a recommendation of an analytics report to view.

18. The computing system of claim 17, wherein the current context is at least one of a currently accessed report, variables attached to the currently accessed report, and data associated with the currently accessed report.

19. The computing system of claim 17, further comprising:
means for the user to interact with the one or more recommendations.

20. The computing system of claim 19, wherein the user interaction is at least one of previewing an item included in the one or more recommendations, accessing the item using the analytics system, applying the item within the analytics system, and sending feedback regarding the item to a recommendation system.

* * * * *